E. MELDAL.
NUT, BOLT, SCREW, AND THE LIKE.
APPLICATION FILED AUG. 31, 1920.

1,397,876. Patented Nov. 22, 1921.

Inventor:
Edward Meldal.
Attorney:

UNITED STATES PATENT OFFICE.

EDWARD MELDAL, OF LONDON, ENGLAND.

NUT, BOLT, SCREW, AND THE LIKE.

1,397,876.   Specification of Letters Patent.   Patented Nov. 22, 1921.

Application filed August 31, 1920. Serial No. 407,190.

*To all whom it may concern:*

Be it known that I, EDWARD MELDAL, of 49 Elm Park Mansions, Park Walk, Chelsea, London, S. W., England, a subject of the King of Great Britain and Ireland, have invented certain new and useful Improvements in or Relating to Nuts, Bolts, Screws, and the like, of which the following is a specification.

This invention relates to nuts, bolts, screws and the like, and the object is to provide a form of construction of nut, bolt or equivalent which can be much more readily manipulated for turning, as for tightening up or slacking off, than hitherto.

With this object in view, and taking as example a nut, I form the body of same with the usual threaded aperture to receive the shank of the bolt, screw or the like, but around the edge of said body, usually provided with angularly disposed faces, I provide radial arms or projections of any desired number, say four or six, these arms or projections forming part of a base integral with the body; or as an antalternative, for purposes of lightness, the base may be apertured between the arms; or again about the exterior of said arms a rim connecting all of same together may be provided, thus producing a series of apertures or recesses around the nut into which any appropriate tool or implement, such as a "tommy" bar, or other device which may be handy, can be inserted for rotating the nut, thus permitting the use of wrenches or equivalents to be dispensed with.

The contour of the nut may be circular, hexagonal, octagonal or of other polygonal or desired shape, and obviously where the usual polygonal faces are provided around said outer edge, they may be used when necessary for the application of ordinary wrenches, etc.

The radial arms or projections are formed integrally with the nut body, sufficient thickness and strength of material being provided to withstand considerable strain and obviate fracture or distortion of the nut under heavy pressures or stresses without detracting from the provision of sufficiently large apertures or recesses for insertion of the non-special tools or devices for manipulation, as mentioned above.

Two embodiments of the invention as applied to nuts with forms of implements adapted for their manipulation are shown in the accompanying drawings, wherein:—

Figure 5:
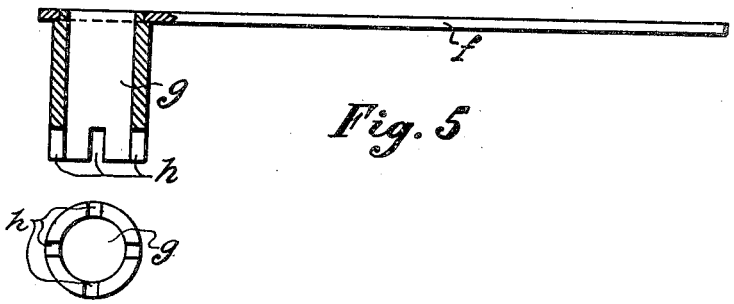
Figure 1:
Figure 3:
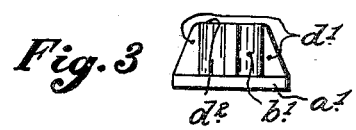
Figure 2:
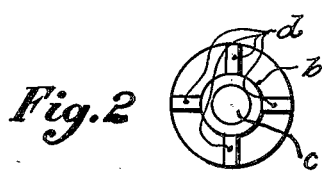
Figure 4:
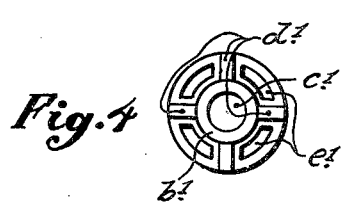
Figure 6:
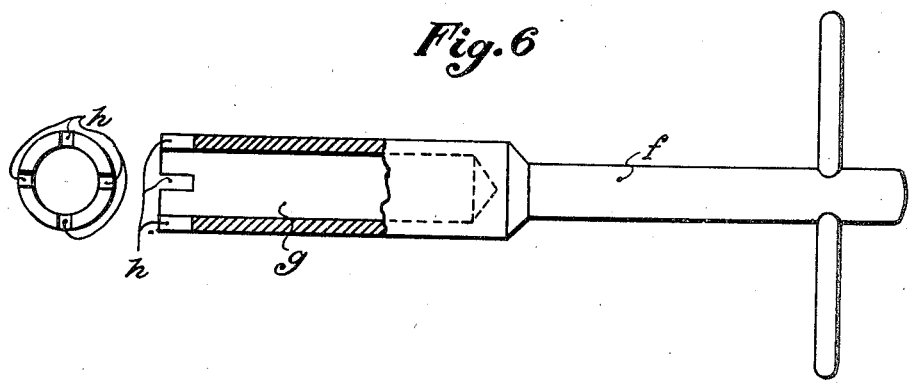

Figure 1 is a side view of one form of nut, and Fig. 2 a plan view thereof: Figs. 3 and 4 are similar views of the second form of nut: Fig. 5 is a partial section and detail of one form of key suitable for use with either form of nut and Fig. 6 a similar view to Fig. 5 of a second form of key.

In Fig. 1 the nut consists of a base $a$ shown as circular in contour having a central boss $b$ with threaded hole $c$, and from said boss integral therewith and with the base $a$ extend a number of radial arms $d$, four of such being shown, the upper corners of said arms being shown as rounded off at $e$. The nut is thus complete and can be manipulated by any appropriate tool, two such being shown in Figs. 5 and 6 in the form of keys $f$, one straight and the other angular, according to the position of the nut and space available, the ends of such keys being hollow and circular as at $g$ and provided with slots $h$ which fit over the nut arms so that the nut can be readily turned in either direction.

In the form of nut shown in Figs. 3 and 4 there is again a circular base $a^1$ with central boss $b^1$ having threaded hole $c^1$, the arms $d^1$ being also integral with said base and boss, but inclined upwardly and inwardly from the outer edge of the base to the upper edge of the boss. In addition the base is apertured between the arms as at $e^1$ for purposes of lightness, and also for reception of a tool or implement for turning the nut if one or other of the special keys as above referred to is not available. The apertures $e^1$ in the base also have the additional advantage that when the nut is in position, some degree of oxidation of the metal occurs around the edges of the aperture tending to hold the nut in tightened position and serving to some extent to so lock the nut.

According to the invention the heads of bolts, screws, studs and the like may be formed in a like manner to the nuts as above described.

What I claim as my invention and desire to secure by Letters Patent of the United States is:—

1. An article of manufacture of the character described embodying therein a base of any desired contour, a central boss extending from and integral with said base and a plurality of radial projections extending from said boss and integral both with the latter and the base, each of said projections having oppositely disposed parallel faces.

2. An article of manufacture of the character described embodying therein a base of any desired contour, a central boss extending from and integral with said base and radial projections extending from said boss and integral both with the latter and the base, said base having apertures extending therethrough located between the aforesaid radial projections.

3. An article of manufacture of the character described embodying therein a base of any desired contour, a central interiorly threaded boss extending from and integral with said base, radial projections extending from said boss and integral therewith and with the base, said projections having their entire outer edges inclined inwardly from the base to the outer edge of the threaded boss, and said base having apertures extending therethrough located between the aforesaid projections.

In witness whereof I have signed this specification.

EDWARD MELDAL.